United States Patent
Uchiyama et al.

(10) Patent No.: US 6,700,655 B2
(45) Date of Patent: Mar. 2, 2004

(54) OPTICAL FIBER CHARACTERISTIC MEASURING DEVICE

(75) Inventors: Haruyoshi Uchiyama, Kawasaki (JP); Yoshiyuki Sakairi, Kawaguchi (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 10/132,653

(22) Filed: Apr. 24, 2002

(65) Prior Publication Data

US 2002/0154291 A1 Oct. 24, 2002

(30) Foreign Application Priority Data

Apr. 24, 2001 (JP) ........................................ 2001-126578

(51) Int. Cl.[7] ............................................. G01N 21/00
(52) U.S. Cl. ..................................................... 356/73.1
(58) Field of Search ........ 356/73.1; 250/559.04–559.08

(56) References Cited

FOREIGN PATENT DOCUMENTS

JP          11-023419       *  1/1999

* cited by examiner

*Primary Examiner*—Tu T. Nguyen
(74) *Attorney, Agent, or Firm*—Darby & Darby

(57) ABSTRACT

Optical fiber characteristic measuring device comprising a coherent light supply device, a light pulse generating device, a wave mixing device, a opto-electrical converting device, and a processing device, is provided such that parts have the frequency characteristic for corresponding to low frequency component for an opto-electrical converting device and a processing section so as to reduce the cost of the circuits.

6 Claims, 5 Drawing Sheets

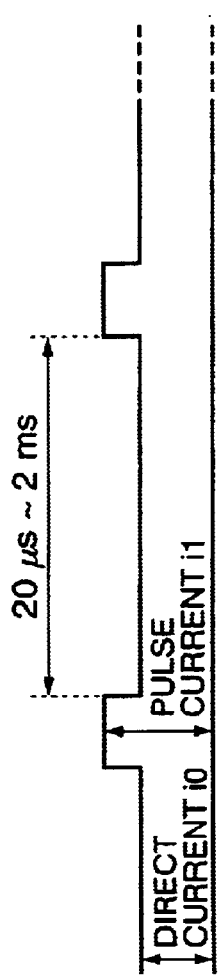
Fig. 2A  DRIVING CURRENT
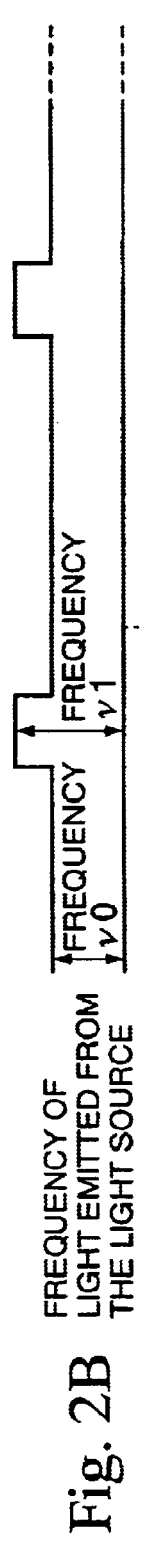
Fig. 2B  FREQUENCY OF LIGHT EMITTED FROM THE LIGHT SOURCE
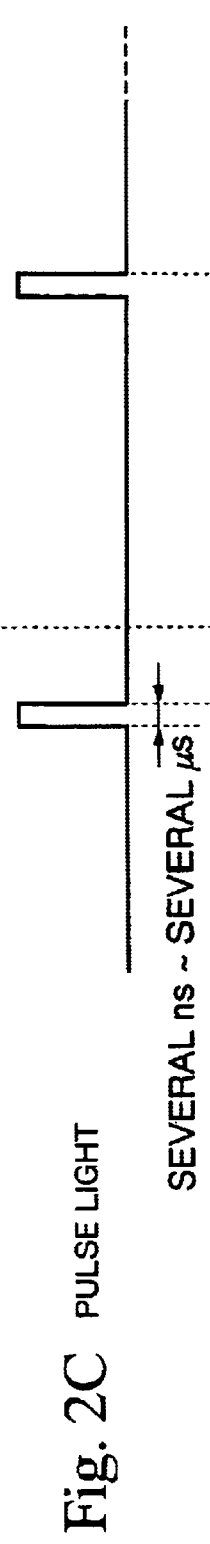
Fig. 2C  PULSE LIGHT
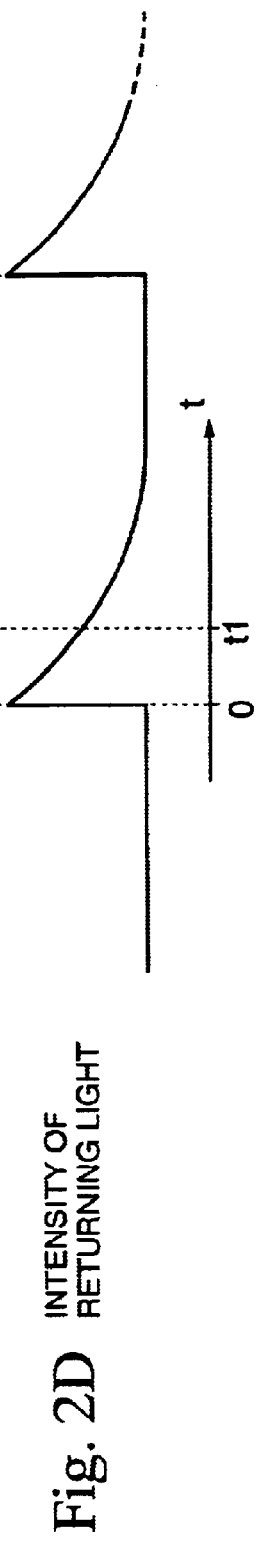
Fig. 2D  INTENSITY OF RETURNING LIGHT

OPTICAL FIBER CHARACTERISTIC MEASURING DEVICE

BACKGROUND OF THE INVENTION

1. Field of the Invention

The present invention relates to an optical fiber characteristic measuring device which produces a pulse of light incident to an optical fiber as an object to be measured and measures the characteristic of the optical fiber according to the returning light emitted from the optical fiber.

2. Description of Related Art

FIG. 5 is a block diagram showing a structure of an example of a conventional optical fiber characteristic measuring device. A light of constant frequency of v0 which is emitted from the light source 1 is incident on an incident port 4*i* of a first optical directional coupler 4. The first optical directional coupler 4 has an incident port 4*i* and two emitting ports 4*t*1 and 4*t*2. The first optical directional coupler 4 separates the light incident on the incident port 4*i* into 2 directions and emits the light from the two emitting ports 4*t*1 and 4*t*2.

The light which is emitted from the emitting port 4*t*1 of the first optical directional coupler 4 is incident on the light pulse generating device 5. The light pulse generating device 5 is specifically an electro-optical switch. The light pulse generating device 5 extracts the light pulse from the incident light by turning the switch on and off and emits the extracted light pulse.

The light pulse emitted from the light pulse generating device 5 is incident on a light amplifier 6. The light amplifier 6 amplifies the incident light pulse to a predetermined level and emits the amplified light pulse. The light pulse emitted from the light amplifier 6 is incident on an incident port 7*i* of an optical switch 7. The optical switch 7 has three ports such as an incident port 7*i*, an emitting/incident port 7*ti*, and an emitting port 7*t*, and emits the light pulse which is incident on the incident port 7*i* from the emitting/incident port 7*ti*. The optical switch 7 also emits the returning light which is incident on the emitting/incident port 7*ti* from the emitting port 7*t*.

The emitting/incident port 7*ti* of the optical switch 7 is connected to an end 9*a* of the optical fiber 9 as an object to be measured via an optical connector 8. Therefore, the light pulse emitted from the emitting/incident port 7*ti* of the optical switch 7 is incident on an end 9*a* of the optical fiber 9 via an optical connector 8. The returning light which is emitted from the end 9*a* of the optical fiber 9 is incident again on the emitting/incident port 7*ti* of the optical switch 7, and is further emitted from the emitting port 7*t* of the optical switch 7.

The returning light emitted from the emitting port 7*t* of the optical switch 7 is incident to the incident port 10*i*1 of the second light directional coupler 10. The second light directional coupler 10 has two incident ports such as 10*i*1 and 10*i*2 and two emitting ports such as 10*t*1 and 10*t*2. To the incident port 10*i*2 of the second light directional coupler 10, the light (hereinafter called "reference light") emitted from the emitting port 4*t*2 of the first light directional coupler 4 is incident. Consequently, the second light directional coupler 10 combines the wave of the returning light which is incident from the incident port 10*i*1 and the wave of reference light which is incident from the incident port 10*i*2. The second light directional coupler 10 further separates the combined light into two directions, and emits the lights from the two emitting ports 10*t*1 and 10*t*2.

Both of the combined lights emitted from the two emitting ports 10*t*1 and 10*t*2 of the second light directional coupler 10 are received by balance receiving photodiode PD11. The balance receiving photodiode PD11 converts the combined lights which is received to an electric signal (beat signal) and outputs the converted electric signal (beat signal). The beat signal which is output by the balance light receiving photodiode PD11 is input to an amplifier 12. The amplifier 12 amplifies the input beat signal to a predetermined level and sends the amplified beat signal to a mixer 13.

The mixer 13 mixes the beat signal sent from the amplifier 12 and an RF signal generated by a signal generating circuit 14, and outputs the mixed signal. A control circuit 15 controls the signal generating circuit 14 and determines the frequency vr of the RF signal generated by the signal generating circuit 14. The frequency vr of the RF signal is set to a value which is close to 10.8 GHz as a shifting amount by the Brillouin scattering.

A low pass filter 16 inputs the mixed signal which is output by the mixer 13, removes high frequency component which is included in the mixed signal which is input, passes only low frequency component, and outputs a difference signal which is a low frequency component. The amplifier 17 amplifies the difference signal which is output by the low pass filter 16 to a predetermined level, and outputs the amplified difference signal. The signal process section 18 inputs the difference signal which is output by the amplifier 17, performs various signal treatment on the inputted difference signa, and determines the characteristic of the optical fiber 9.

Next, the operation of the optical fiber characteristic measuring device is explained. The light with the frequency of v0 emitted from the light source 1 is sent to the light pulse generating circuit 5 via the light directional coupler 4. Then, the light pulse generating circuit 5 extracts the light pulse with the frequency of v0 from the light which is sent.

The light pulse emitted from the light pulse generating circuit 5 is incident on the end 9*a* of the optical fiber 9 via an optical amplifier 6, an optical switch 7, and an optical connector 8. When the incident light pulse is transmitted in the optical fiber 9, Brillouin scattering, Rayleigh scattering, and reflection occur at several points in the optical fiber 9, then the returning light including the Brillouin scattered light, Rayleigh scattered light, and reflected light return to the end 9*a* from such several points. The returning light is emitted from the end 9*a*.

The returning light emitted from the end 9*a* of the optical fiber 9 and including the Brillouin scattered light is incident again on the emitting/incident port 7*ti* of the optical switch 7 via the optical connector 8, and is further emitted from the emitting port 7*t*. The returning light emitted from the emitting port 7*t* of the optical switch 7 and including the Brillouin scattered light is incident on the incident port 10*i*1 of the second light directional coupler 10. Additionally, to another incident port 10*i*2 of the second light directional coupler 10, the reference light emitted from the emitting port 4*t*2 of the first light directional coupler 4 with a frequency of v0.

The second light directional coupler 10 mixes the wave of the Brillouin scattering light with frequency of v0±vB and the wave of reference light with frequency of v0. Consequently, resonance occur because the frequencies of these lights are so close that interference is caused. The frequency of the resonance is represented as the difference between the frequency of Brillouin scattering light such as v0±vB and the frequency of the reference light such as v0. Therefore the frequency of the resonance becomes vB.

When the mixed light in which the resonance of which frequency is νB occurs is received by the balance receiving photodiode PD11, the balance receiving photodiode PD11 outputs the beat signal having the resonance of which frequency is νB. The beat signal which is output by the balance receiving photodiode PD11 and has the resonance of which frequency is νB is input to the mixer 13 via the amplifier 12. An RF signal of which frequency is νr which is generated by the signal generating circuit 14 is input into the mixer 13 together with the beat signal having the resonance of which frequency is νB, and these signals are mixed. Here, the frequency νr of the RF signal which is generated by the signal generating circuit 14 is set quite close to the frequency νB in advance. Then, the beat signal and the RF signal interfere; thus the resonance occurs. The frequency of the resonance is represented by a difference between the frequency νB of the beat signal and the frequency νr of the RF signal such as νB−νr. The frequency νr of the RF signal which is generated by the signal generating circuit 14 is set quite close to the frequency νB of the resonance of the beat signal.

When the mixed signal in which the resonance of which frequency is νB−νr occurs is input to the low pass filter 16, the low pass filter 16 cuts the high frequency signal (signal of which the frequency is νB or νr) included in the mixed signal, and outputs the difference signal having only frequency νB−νr of the resonance as a low frequency signal. The signal processing section 18 measures the frequency of the difference signal. Additionally, the signal processing section 18 calculates the frequency νB of the beat signal from the frequency νB−νr of the difference signal which is measured, and calculates the shifting amount νB due to the Brillouin scattering. Furthermore, the signal processing section 18 determines the distortion amount in a predetermined point in the optical fiber 9 from the shifting amount νB which is calculated.

For a balance receiving photodiode PD11, and amplifier 12, a mixer 13, and a signal generating circuit 14 of the above described optical fiber characteristic measuring device, components having frequency characteristic so as to correspond to high frequencies such as 10.8 GHz of shifting amount νB due to the Brillouin scattering need be used; thus, the problem is that the cost for such components increases.

SUMMARY OF THE INVENTION

The present invention was made in consideration of the above problem and provides an optical fiber characteristic measuring device which can reduce the cost of the above mentioned circuits and the like.

The invention according of the first aspect 1 is an optical fiber characteristic measuring device comprising a coherent light supply device which supplies a coherent light with a second frequency which is almost equal to the frequency of coherent light with a first frequency and the frequency of returning light emitted from this optical fiber when the coherent light with first frequency is incident to the optical fiber as an object to be measured, a light pulse generating device which converts the coherent light with first frequency which is supplied by the coherent light supply device to light pulse and emits the light pulse which is converted, a wave mixing device which mixes the wave of returning light emitted from the optical fiber and the wave of the coherent light with second frequency supplied from the coherent light supply device when the light pulse emitted by the light pulse generating device is incident on the optical fiber as an object to be measured and emits the mixed light, a opto-electrical converting device which converts the mixed light emitted from the wave mixing device to an electrical signal and outputs the electrical signal which is converted, a processing device which calculates a shifting amount to the frequency of the returning light emitted from the optical fiber from the first frequency of coherent light which is incident to the optical fiber as an object to be measured according to the electric signal which is output from the opto-electrical converting device and determines characteristic of the optical fiber from the calculated shifting amount.

The invention of the second aspect is an optical fiber characteristic measuring device according to the first aspect, wherein the coherent light supply device has a driving device which can output more than two kinds of driving current and a light source which can alter the frequency of the coherent light which is emitted corresponding to the driving current which is output by the driving device.

The invention according to the third aspect is an optical fiber characteristic measuring device according to the second aspect, wherein the light source is a distributed-feedback laser diode.

The invention according to the fourth aspect is an optical fiber characteristic measuring device according to the second aspect, wherein the returning light emitted from the optical fiber is Brillouin scattered light.

According to the present invention, parts having the frequency characteristic for corresponding to low frequency component for an opto-electrical converting device (balance receiving photodiode PD11 in the present embodiment) and a processing section (balance receiving photodiode PD11, amplifier 12, mixer 13, signal generating circuit 14 in the present embodiment); thus, the cost of opto-electrical converting device and the processing section can be reduced.

BRIEF DESCRIPTION OF THE DRAWINGS

FIGS. 2A to 2D are diagrams showing the waveform at various points in an optical fiber characteristic measuring device in an embodiment of the present invention.

DETAILED DESCRIPTION OF THE INVENTION

Figure 1:
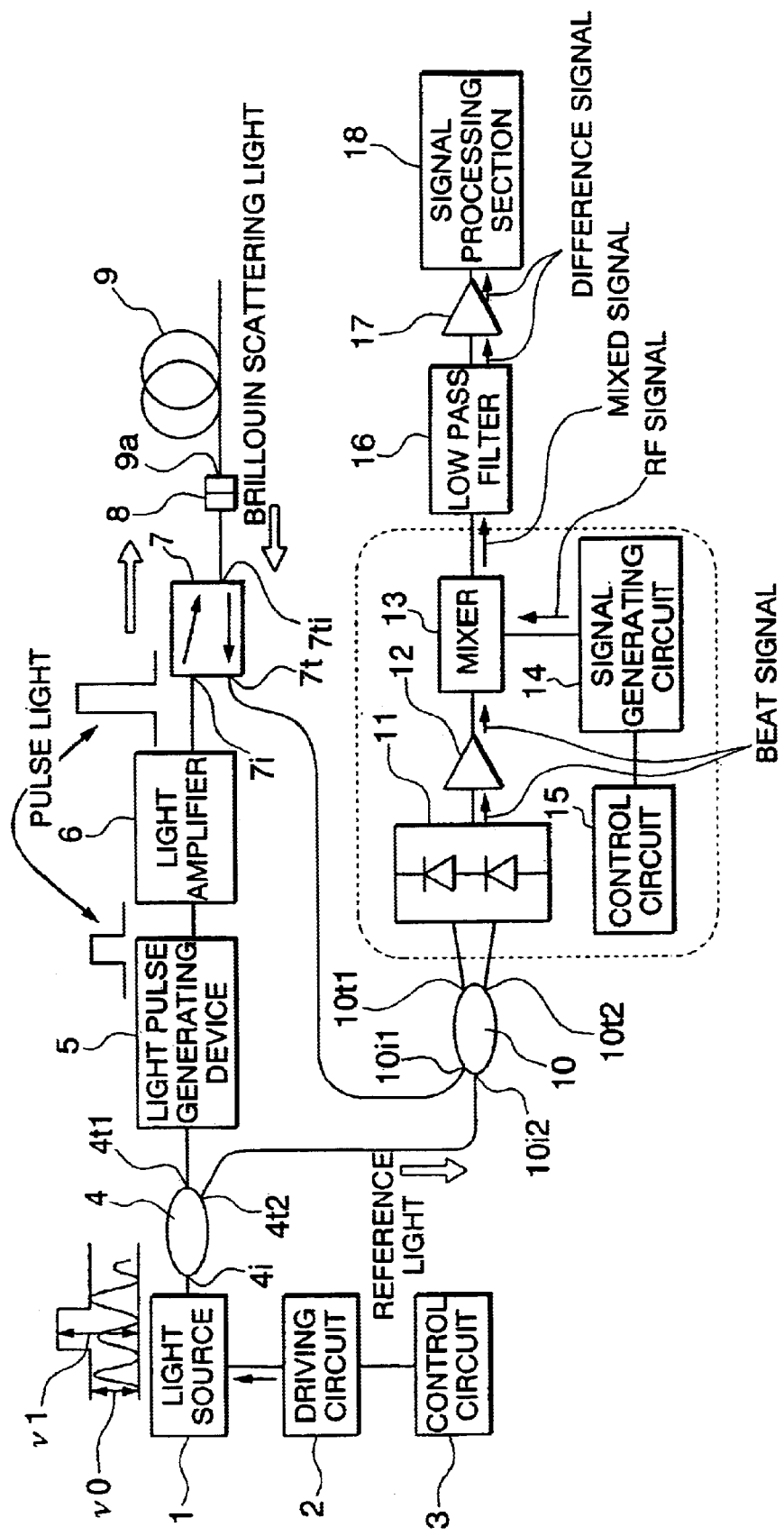
FIG. 1 is a block diagram showing the structure of an optical fiber characteristic measuring device in an embodiment of the present invention.

FIG. 1 is a block diagram showing the structure of an optical fiber characteristic measuring device in an embodiment of the present invention. The light source 1 is specifically a DFB-LD (distributed-feedback laser diode), and emits a coherent light of which the line width is narrow, such as 1.55 $\mu$m bandwidth of wavelength $\lambda 0$, that is, frequency ν0 is a bandwidth of 193.55 THz). The wavelength (or the frequency) of the light emitted by the light source 1 slightly changes according to the driving current which is supplied to the light source 1.

The driving circuit 2 can supply two kinds of driving current to the light source 1. That is, the driving circuit 2 can supply the driving current i0 to the light source 1, and can also supply the driving current i1 to the light source 1. These driving current values are, for example, i0=70 mA, and i1=80 mA. The control circuit 3 controls the driving circuit 2 and determines the driving current which is supplied to the light source 1 by the driving circuit 2. That is, by the control circuit 3, the driving current i0 can be supplied to the light source 1 by the driving circuit 2, and the driving current i1 can also be supplied to the light source 1 by the driving circuit 2.

By doing this, it becomes possible for light source 1 to emit light of two wavelengths are such as $\lambda 0$ and $\lambda 1$, which may also by referred to as v0 and v1. That is, when the driving current i0 is supplied, the light source 1 emits the light having wavelength v0, when the driving current i1 is supplied, the light source 1 emits the light having wavelength v1. The driving current i0 and i1 are determined so that the difference v1−v0 of the frequency of two lights emitted by the light source 1 become close value to the shifting amount vB of the frequency due to the below-mentioned Brillouin scattering. For example 1, the frequency vB is 10.8 GHz, the driving current i0 and i1 are determined such that the difference v1−v0 becomes 12.0 GHz.

The light which is emitted by the light source 1 is incident to the incident port 4i of the first light directional coupler 4. The light directional coupler 4 has an incident port 4i and two emitting ports 4t1 and 4t2, and separates the incident light to the incident port 4i into two directions, and emits the lights from two emitting ports 4t1 and 4t2. The emitted light from the emitting port 4t1 of the first light directional coupler 4 is incident on the light pulse generating circuit 5. The light pulse generating circuit 5 is specifically an electro-optical switch, extracts the light pulse from the incident light by turning the switch on and off, and emits the extracted light pulses.

The light pulse which is emitted by the light pulse generating circuit 5 is incident on the light amplifier 6. The light amplifier 6, specifically an electro-optical amplifier using an Er(Erbium) doped fiber, amplifies the incident light pulse to a predetermined level, and emits the amplified light pulse.

The light pulse emitted by the light amplifier 6 is incident on the incident port 7i of the optical switch 7. The optical switch 7 is specifically a light circulator, and has three ports such as an incident port 7i, an emitting/incident port 7ti, and an emitting port 7t. The optical switch 7 emits the incident light pulse to the incident port 7i from the emitting/incident port 7ti, and also emits the returning light which is incident to the emitting/incident port 7ti from the emitting port 7t. The emitting/incident port 7ti of the optical switch 7 is connected to an end 9a of the optical fiber 9 as an object to be measured.

Therefore, the light pulse which is emitted from the emitting/incident port 7ti of the optical switch 7 is incident to the end 9a of the optical fiber via the optical connector 8. The returning light which is emitted from the end 9a of the optical fiber 9 is incident again into the emitting/incident port 7ti of the optical switch 7 again via the optical connector 8, and is further emitted from the emitting port 7t of the optical switch 7.

The returning light which is emitted from the emitting port 7t of the optical switch 7 is incident to the incident port 10i1 of the second light directional coupler. The second light directional coupler 10 has two incident ports 10i1 and 10i2, two emitting ports 10t1 and 10t2. The light (hereinafter called a reference light) emitted from the emitting port 4t2 of the first light directional coupler 4 is incident on the incident port 10i2 of the second light directional coupler 10. Then, the second light directional coupler 10 mixes the wave of the returning light which is incident from the incident port 10i1 and the wave of the reference light which is incident from the incident port 10i2, separates the mixed lights into two directions, and emits the lights from two emitting ports 10t1 and 10t2.

Both of the mixed lights emitted from two emitting ports 10t1 and 10t2 of the second light directional coupler 10 are received by the balance receiving photodiode PD11 (Balance receiving photodiode). The balance receiving photodiode PD11 converts the received mixed light to an electric signal (beat signal), and outputs the converted electric signal (beat signal). Also, the balance receiving photodiode PD11 removes noises in the process of balance receiving. The beat signal which is output by the balance receiving photodiode PD11 is input to the amplifier 12. The amplifier 12 amplifies the input beat signal to a predetermined level, and sends the amplified beat signal to the mixer 13.

The mixer 13 mixes the beat signal which is sent from the amplifier 12 and the RF signal (Radio Frequency signal) generated by the signal generating circuit 14, and outputs the mixed signal. The control circuit 15 controls the signal generating circuit 14, and determines the frequency fr of the RF signal generated by the signal generating circuit 14. The frequency fr of the RF signal is determined according to which frequency light in the returning light should be detected. In the case of detecting Brillouin scattered light, the frequency fr of the RF signal is set to 1.2 GHz, and is set to 100 KHz in the case of detecting Rayleigh scattered light.

The low pass filter 16 inputs the mixed signal which the mixer 13 outputs, removes the high frequency components included in the input mixed signal, passes only low frequency components, and outputs the difference signal as a low frequency component. The amplifier 17 amplifies the difference signal which is output by the low pass filter 16 to a predetermined level, and outputs the amplified difference signal. The signal processing section 18 inputs the difference signal which is output by the amplifier 17, performs various signal processing to the input difference signal and determines the characteristic of the optical fiber 9. More specifically, the signal processing section 18 firstly measures the frequency of the difference signal, next calculates the frequency of the beat signal from the frequency of the difference signal, and furthermore calculates the shifting amount as the difference between the frequency of the light pulse which is incident to the optical fiber 9 and the frequency of the returning light. Then, the characteristic of the optical fiber 9 is determined from the calculated shift amount. In this explanation of FIG. 1, an optical switch 7 may be replaced by an optical coupler. Also, balance receiving photodiode PD11 may be replaced by a non balance type photodiode. In this case, optic sensitivity of photodiode may decrease.

Next, the operation of the present embodiment is explained. FIGS. 2A to 2D are diagrams of waveforms of various sections of the optical fiber characteristic measuring device in the present embodiment. A horizontal axis is time in this diagram. FIG. 2A is a diagram of the waveform of the driving current which the driving circuit 2 supplies to the light source 1. In the waveform of the driving current, the direct current period in which the current value is i0 and the pulse current period in which the current value is i1 are repeated alternately, the period in which the current value is i1 is 20 µs to 2 ms. The period of direct current is determined according to the length of the optical fiber 9 as an object to be measured. For example, if the length of the optical fiber 9 is 10 km, the period is 200 µs. If the length of the optical fiber 9 is 1 km, the period is 20 µs.

When the driving circuit 2 supplies the driving current to the light source 1 as shown in FIG. 2A, the light source 1 emits light having the frequency shown in FIG. 2B. That is, the light source 1 emits light having the frequency v0 and light having the frequency v1 alternately corresponding to the waveform of the driving current.

The emitted light form the light source 1 is sent to the light pulse generating circuit 5 via the light directional coupler 4. Then, the light pulse generating circuit 5 emits the light pulse having the waveform as shown in FIG. 2C. That is, the light pulse generating circuit 5 extracts the light pulse having frequency v1 from the light which is sent. At this time, the period of emitting the light pulse is several ns to several µs.

The light pulse which is emitted by the light pulse generating circuit 5 is incident to an end 9a of the optical fiber 9 via the light amplifier 6, the optical switch 7, and the optical connector 8. When the light pulse which is incident is transmitted in the optical fiber 9, the Brillouin scattering, Rayleigh scattering, and reflection occur at several points in the optical fiber 9, and the returning light including the Brillouin scattered light, the Rayleigh scattered light, and the reflection light returns to the end 9a from several points. The returning light is emitted from the end 9a.

FIG. 2D is a diagram showing the waveform of the returning light which is emitted from the end 9a. The Brillouin scattering or the likes occur at various points in the optical fiber 9. The returning light returning from the close points to the end 9a is emitted from the 9a early because it does not take time for its transmission to the end 9a. In contrast, the returning light returning from the distant points to the end 9a is emitted from the 9a late because it takes time for its transmission to the end 9a. Additionally, this applies to the time taken for the transmission of the light pulse which is incident from the end 9a of the optical fiber 9 to various points in the optical fiber 9. That is, the time taken during the incidence of the light pulse into the end 9a and the return of the returning light corresponds to the distance between the end 9a and the points where the Brillouin scattering and the like occur. Accordingly, if the returning light which is emitted from the end 9a is detected at a predetermined timing, the characteristic of the optical fiber 9 at a point having distance corresponding to the timing to can be detected. More specifically, if the frequency of the Brillouin scattered light included in the returning light is detected, the amount of the distortion at a predetermined point in the optical fiber 9 can be detected.

Figure 3:
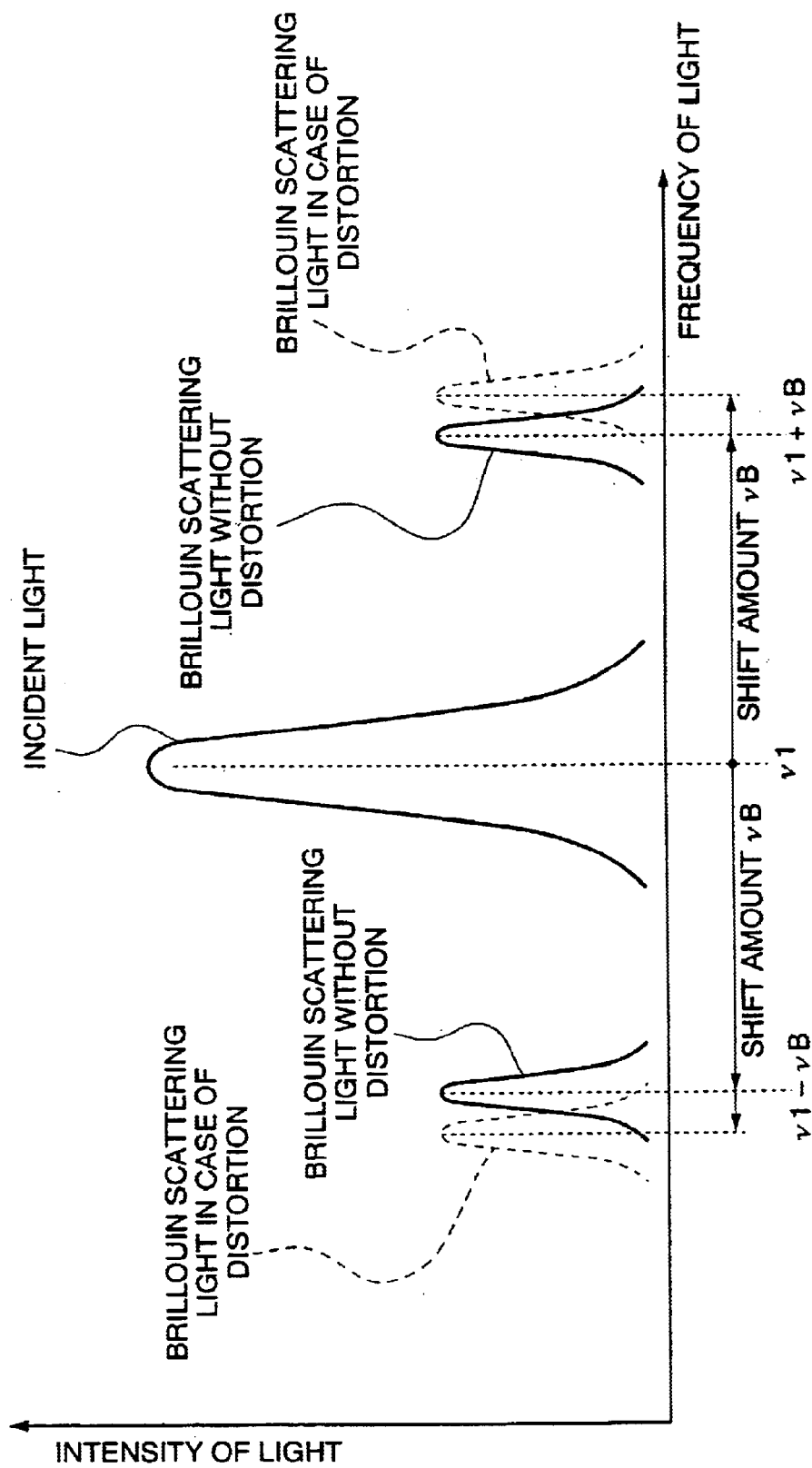
FIG. 3 is a diagram showing the relationship between the frequency of the light pulse which is incident from the end 9a of the optical fiber 9 and the frequency of the Brillouin scattered light included in the returning light emitted from the end 9a at a predetermined timing t1.

FIG. 3 shows a relationship between the frequency of the light pulse which is incident from the end 9a of the optical fiber 9 and the frequency of the Brillouin scattered light included in the returning light which is emitted from the end 9a at a predetermined timing t1. In this drawing, a horizontal axis indicates the frequency of the light, and the vertical axis indicates the intensity of the light. The frequency of the Brillouin scattered light shifts to upward direction of the frequency and to downward direction of the frequency from the frequency v1 of the incident light pulse. The shift amount vB alters according to the amount of the distortion at predetermined points in the optical fiber 9. Therefore, if the shift amount vB is detected, the amount of distortion at predetermined points in the optical fiber 9 can be detected.

The returning light emitted from the end 9a of the optical fiber 9 and including the Brillouin scattering light is incident again to the emitting/incident port 7ti of the optical switch 7 via the optical connector 8, and is further emitted from the emitting port 7t. The returning light emitted from the emitting port 7t of the optical switch 7 and including the Brillouin scattering light is incident to the incident port 10i1 of the second light directional coupler 10. On the other hand, the reference light which is emitted from the emitting port 4t of the first light directional coupler 4 is incident to the other incident port 10i2 of the second light directional coupler 10.

Figure 4:
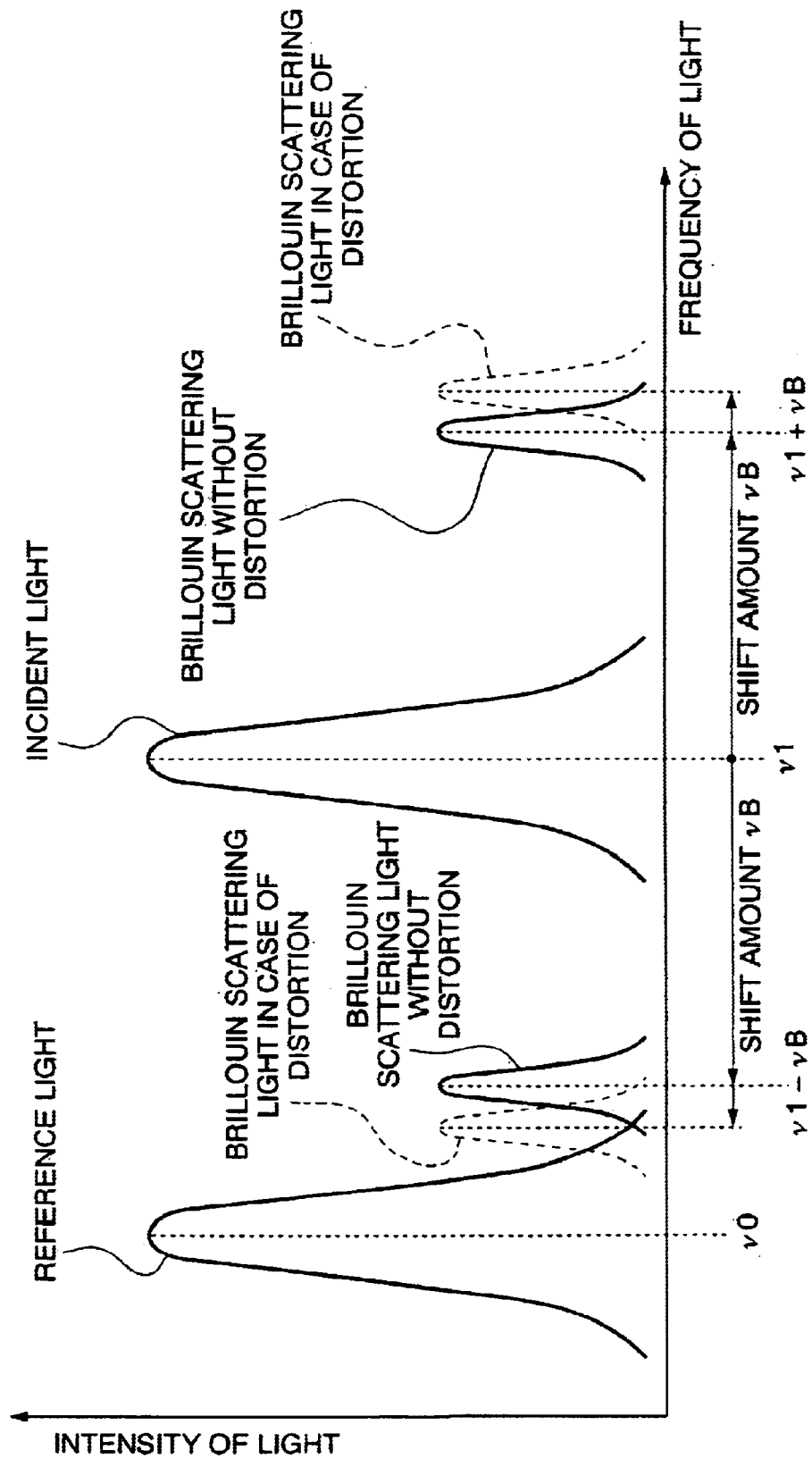
FIG. 4 is a diagram showing the relationship between the frequency ν0 of the reference light and the frequency ν1±νB of the Brillouin scattering light.
Figure 5:
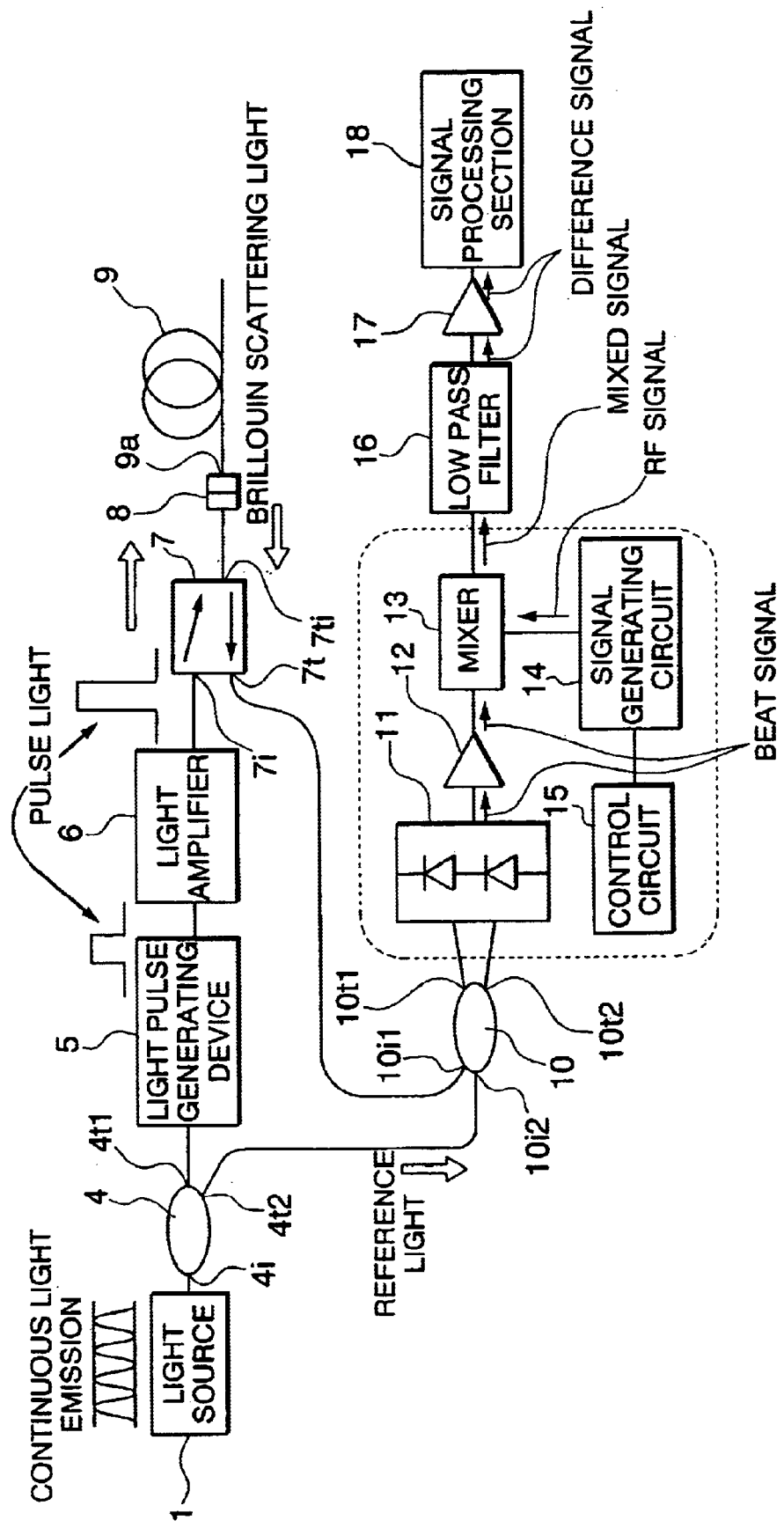
FIG. 5 is a block diagram showing the structure of a conventional optical fiber characteristic measuring device.

FIG. 4 is a diagram showing the relationship between the frequency of the reference light and the frequency v1±vB of the Brillouin scattered light. In this diagram, a horizontal axis indicates frequency of light, and a vertical axis indicates intensity of light. During the period in which the returning light including the Brillouin scattered light is incident on the incident port 10i1 of the second light directional coupler 10, the frequency of the reference light is v0. Accordingly, the second light directional coupler 10 mixes the wave of the Brillouin scattering light having frequency v1±vB and the wave of the reference light having frequency v0. Then, these lights interfere because the frequencies of these lights are close; thus, the resonance occurs. The frequency of the resonance is a difference between the frequency v1±vB of the Brillouin scattered light and the frequency of the reference light v0, such as v1±vB−v0.

When the mixed light in which the resonance having frequency v1±vB−v0 occurs is received by the balance receiving photodiode PD11, the balance receiving photodiode PD 11 outputs the resonance of which the frequency is lower such as beat signal having a resonance frequency of v1+vB−0. The resonance of which the frequency is higher, such as a resonance having frequency v1+vB−v0 is cut by the frequency characteristic of the balance receiving photodiode PD11.

Here, the frequency v1−vB−v0 of the resonance of the beat signal becomes low because the difference of the frequency v1−v0 is set to the close value of shift amount vB due to the Brillouin scattering in advance. For example, when vB is 10.8 GHz and v1−v0 is 12.0 GHz, the frequency of the resonance becomes v1−vB−v0=12.0 GHz−10.8 GHz= 1.2 GHz. Therefore, for a balance receiving photodiode PD11 which only should be able to output the beat signal and for an amplifier 12 to which the beat signal is input, and a mixer, parts which has frequency characteristic as to correspond to such level of frequency are only sufficient. Therefore, the cost of the balance receiving photodiode PD11, the amplifier 12, an the mixer 13 can be reduced.

The beat signal emitted from the balance receiving photodiode PD11 and having the resonance of which frequency is v1−vB−v0 is input to the mixer 13 via the amplifier 12. The RF signal of frequency fr and generated by the signal generating circuit 14 is input to the mixer 13 with the beat signal having the resonance of which frequency is v1−vB− v0, and these signals are mixed. Here, the frequency fr of th RF signal generated by the signal generating circuit 14 is set to the value close to the frequency v1−vB−v0 in advance. Then, the beat signal and the RF signal interfere, and the resonance occurs. The frequency of the resonance becomes the difference between the frequency v1−vB−v0 and the frequency fr of the RF signal such as v1−B−v0−fr.

The frequency fr of the RF signal generated by the signal generating circuit 14 is set quite close to the frequency of the resonance v1−vB−v0 of the beat signal. Because the frequency v1−vB−v0 becomes low, the frequency fr of the RF signal may also be low. Therefore, for a signal generating circuit 14, it is only acceptable as long as the parts has the frequency characteristics for corresponding to such low frequencies. Thus, the cost of the signal generating circuit 14 can be reduced.

When the mixed signal in which the resonance occurs with frequency $v1-vB-v0-fr$ is input to the low pass filter 16, the low pass filter 16 cuts the high frequency signal included in the mixed signal (signal having frequency of $v1-vB-v0$ or $fr$), and outputs difference signal having only resonance frequency of $v1-vB-v0-fr$ as a low frequency signal. In other words, high frequency $v1-vB-v0$ of the beat signal decreased and become lower by a degree of frequency $fr$ to be a low frequency difference signal.

The signal processing section 18 measures the frequency of the difference signal. As mentioned above, the frequency of the difference signal decreased; thus the measurement becomes easy. The frequency of the beat signal $v1-vB-v0$ is calculated from the frequency $v1-vB-v0-fr$ of the measured difference signal, furthermore, the shifting amount $vB$ due to the Brillouin scattering is calculated. Then, the amount of distortion at predetermined positions in the optical fiber 9 is determined from the calculated shifting amount $vB$.

Additionally, although the above embodiment is an example of detecting the Brillouin scattering light in the returning light, the present invention is not limited to such case. The present invention can be applied to the detection of the Rayleigh scattered light, for example. Because, in the Rayleigh scattering, there is no shift of the frequency ($vB=0$), for example, if $v1-v0$ is 1.2 GHz, the frequency of the resonance of the beat signal is $v1-B-v0=1.2$ GHz$-0=1.2$ GHz. Therefore, in this case, for an amplifier 12 to which the beat signal is input and a mixer 13, it is only acceptable as long as the parts has the frequency characteristics for corresponding to such a frequency. Thus, the cost of an amplifier 12 and a mixer 13 can be reduced.

What is claimed is:

1. An optical fiber characteristic measuring device comprising:

a single coherent light supply device which supplies coherent light having a first frequency and coherent light having a second frequency;

a light pulse generating device which converts the coherent light of the first frequency supplied by the coherent light supply device to a light pulse and emits the light pulse to one end of the optical fiber whose characteristic is being measured;

a wave mixing device which receives and mixes the wave of returning light emitted from the one end of the optical fiber in response to the applied light pulse of the first frequency and the wave of the coherent light of the second frequency supplied from the coherent light supply device and emits mixed light;

an opto-electrical converting device which converts the mixed light emitted from the wave mixing device to an electric signal and outputs the electric signal; and a processing device responsive to the electric signal output from the opto-electrical converting device which calculates a shifting amount of the frequency of the returning light emitted from the optical fiber in response to the pulse of coherent light of the first frequency which is incident to the optical fiber to determine at least one characteristic of the optical fiber from the calculated shifting amount.

2. An optical fiber characteristic measuring device according to claim 1, wherein the coherent light supply device has a driving device which can output at least two kinds of driving current and the coherent light supply device alters the frequency of the coherent light emitted from the first frequency to the second frequency corresponding to the driving current which is output by the driving device.

3. An optical fiber characteristic measuring device according to claim 2, wherein the light source is a distributed-feedback laser diode.

4. An optical fiber characteristic measuring device according to claim 2, wherein the returning light emitted from the optical fiber is Brillouin scattered light.

5. An optical fiber characteristic measuring device as claimed in claim 1, where the opto-electric converting device further comprises an RF signal generating circuit that supplies a signal to the mixer that receives the electric signal, the mixer producing a beat frequency signal that is applied to the processing device.

6. An optical fiber characteristic measuring device as claimed in claim 1, wherein the coherent light supply device produces the coherent light of the first and second frequencies and operates to supply the light of the second frequency to the wave mixing device before the light of the first frequency supplied to the one end of the optical fiber is returned from the optical fiber and applied to the wave-mixing device.

* * * * *